(12) United States Patent
Terfloth et al.

(10) Patent No.: US 6,686,415 B1
(45) Date of Patent: Feb. 3, 2004

(54) SUBSTANCE SYSTEM

(75) Inventors: Christian Terfloth, Detmold (DE); Dieter Guse, Löhne (DE); Theodor Hippold, Bad Salzuflen (DE)

(73) Assignee: Jowat Lobers und Frank GmbH & Co. KG, Detmold (DE)

( * ) Notice: Subject to any disclaimer, the term of this patent is extended or adjusted under 35 U.S.C. 154(b) by 0 days.

(21) Appl. No.: 09/674,886

(22) PCT Filed: Jan. 29, 1999

(86) PCT No.: PCT/DE99/00223

§ 371 (c)(1),
(2), (4) Date: Nov. 7, 2000

(87) PCT Pub. No.: WO99/58590

PCT Pub. Date: Nov. 18, 1999

(30) Foreign Application Priority Data

May 7, 1998 (DE) .......................................... 198 20 270

(51) Int. Cl.[7] .............................. C08J 3/00; C08K 3/20; C08L 75/00; B32B 27/00; B32B 27/40

(52) U.S. Cl. .................... 524/589; 428/423.1; 524/590; 524/591; 524/839; 524/840

(58) Field of Search .................................. 524/591, 839, 524/840, 589, 590; 428/423.1

(56) References Cited

U.S. PATENT DOCUMENTS

| | | | |
|---|---|---|---|
| 4,433,095 A | * 2/1984 | Hombach et al. | ........... 524/563 |
| 5,159,011 A | 10/1992 | Rau et al. | |
| 5,191,012 A | * 3/1993 | Markusch et al. | .......... 524/591 |

FOREIGN PATENT DOCUMENTS

| | | |
|---|---|---|
| DE | 35 29 251 A1 | 2/1987 |
| EP | 142 242 | 5/1985 |
| EP | 204 970 | 12/1990 |
| EP | 505 889 A2 | 9/1992 |

* cited by examiner

*Primary Examiner*—Patrick D. Niland
(74) *Attorney, Agent, or Firm*—Cohen, Pontani, Lieberman & Pavane

(57) ABSTRACT

A one-component dispersion comprising deactivated isocyanates which cross-links already at low temperatures (lower than 70° C.).

7 Claims, No Drawings

SUBSTANCE SYSTEM

CROSS REFERENCE TO RELATED APPLICATIONS/PRIORITY CLAIM

This U.S. Patent has been granted based on a U.S. National Phase Patent Application based on International Patent Application PCT/DE 99/00223, filed Jan. 29, 1999, upon which a claim of priority is made, and which, in turn, claims priority based on German Patent Application DE 198 20 270.9, filed May 7, 1998.

BACKGROUND OF THE INVENTION

1. Field of the Invention

The present invention relates to a one-component dispersion.

2. Discussion of the Prior Art

Nowadays, high performance adhesive bondings are achieved according to the state of the art with reactive adhesives. For this purpose, a series of different adhesive systems is known. Due to their high reactivity, polyisocyanates are used for many applications in this field.

There are, for example, isocyanate-terminated polymers which cross-link after the application with moisture. The disadvantage of these systems is that curing takes a long time since cross-linking is dependent on the diffusion rate of water. Furthermore, cross-linking can remain incomplete in the case of very thick layers.

Two-component adhesives are mixed immediately before their application, which comprises an additional step for the user. Moreover, while preparing the two-component systems, errors may occur in proportioning or in mixing.

Further, one-component systems are known which may be formulated by blocking isocyanates with monofunctional reactants. Said blocking is thermally reversible, so that at elevated temperatures the blocking agent is separated and the released isocyanate forms a thermostable bond with the reactive polymer groups by cross-linking.

The disadvantage of these systems is that, if said blocking agent is volatile at application temperature, it vaporizes and may thus burden the environment or, if said blocking agent remains in the adhesives, it may lead to a deterioration or degradation as to the quality of said adhesives.

European referance 0 204 970 discloses a process for the production of stable dispersions of fine powdered polyisocyanates in a liquid by treating said polyisocyanates with stabilizing agents. In order to produce storage-stable dispersions of polyisocyanates and especially solid polyisocyanates and in order to prevent a premature, undesired reaction with the dispersion medium, the dispersed isocyanates are deactivated on their surface. They then possess a so-called retarded reactivity.

European referance 0 204 970 further discloses the use as a cross-linker for said stable dispersions of fine powdered polyisocyanates produced according to the process of said document. The stabilization of the polyisocyanates is obtained by the application of a polymeric shell. The compounds used to enable this polymeric shell are called stabilizing agents. The deactivated polyisocyanates, which comprise said polymer shell, are called stabilized polyisocyanates. The disadvantage here is that the burst or break-up of the polyurea capsules and thus cross-linking occurs at a temperature between 70 and 180° C.

SUMMARY AND DESCRIPTION OF THE INVENTION

Thus, the object of the present invention is to provide a one-component dispersion cross-linking at low temperatures.

Said problem is solved by a one-component dispersion comprising deactivated isocyanates as a cross-linking component. Applicants surprisingly found out that the use of encapsulated or deactivated isocyanates, which are known per se, as cross-linking agents in aqueous dispersions leads to storage-stable systems cross-linking already at temperatures lower than 70° C.

It is assumed that the self-adhesion forces arising during the formation of the polymeric film mechanically destroy the polymeric shells of the isocyanates, thus leading to a cross-linking reaction which can be shown on the basis of the increase of film cohesion or the reduction of film elasticity, respectively.

The one-component dispersion according to the present invention has the advantage that it cross-links at relatively low temperatures, especially at room temperature, thereby avoiding the disadvantages of stable prior art one-component systems. Compared with prior art two-component adhesives, the one-component dispersions of the present invention provide the advantage that they exclude the possibility of errors in application by the user, e.g. proportioning or mixing errors.

According to one embodiment of the present invention, the amounts of deactivated isocyanates in the one-component dispersions of the present invention are within the range of from 0.1% by weight up to 20% by weight, and especially of from 1% by weight up to 10% by weight.

The one-component dispersions of the present invention may be used in a multitude of applications, e.g. as a paint or a lacquer, as a coating, as a sealing material, as a casting material and/or as an adhesive.

When used as an adhesive, a suitable dispersion adhesive according to the present invention may contain, for example, Dispercoll® KA 8758. According to the present invention, suitable isocyanates are, for example, MDI or TDI, such as TDI-urethdione or TDI-urea. These isocyanates are deactivated according to the method known per se, and the resulting deactivated isocyanates are then added to an appropriate polymer such as a dispersion adhesive, while stirring. When the deactivated isocyanate is homogeneously and smoothly incorporated, the one-component dispersion of the present invention is ready to be used.

The one-component dispersion of the present invention can advantageously be used, for instance, for the bonding of three dimensional furniture fronts. These types of furniture fronts are produced in such a way, nowadays, that a plastic film or foil is pressed to a contoured medium density fiberboard carrier under pressure while applying heat, so that the film or foil takes the shape or the contours of the medium density fiberboard surface. The friction-type bond between the two substrates requires an adhesive which has previously been applied to the carrier. It is known that in order to realize high performance bonding with good heat stability, two-component polyurethane dispersion systems are used, wherein the aqueous dispersion is mixed with the water-emulsible polyisocyanate immediately before use. Due to proportioning errors or insufficient homogenization an optimal heat stability cannot be reached. Furthermore, the pot-life of these two-component systems is limited to a few hours only.

The above-mentioned disadvantages can advantageously be avoided by using the one-component dispersion adhesive of the present invention.

Examples are described in the following.

EXAMPLES

Example 1
Synthesis of Deactivated Isocyanates

Example 1.1

100 ml of cyclohexane are placed into a beaker and 20 g of a TDI-urethdione (Desmodur® TT, Bayer AG) are suspended while strongly stirring. Then, a solution of 0.06 g of methylpentamethylenediamine (Dytek® A, DuPont) in 50 ml of cyclohexane is added. After a stirring time of two hours, the resulting solution is removed from the solvent so that a fine, white powder is obtained.

Example 1.2

The synthesis process corresponds to that of Example 1.1, however, a TDI-urea (Desmodur® LS 2116, Bayer AG) is used instead of said TDI-urethdione.

Example 2
Production and Cross-linking of One-component Dispersion Adhesives The deactivated isocyanates from Examples 1.1 and 1.2 are added to Dispercoll® KA 8758 while stirring. Stirring should continue until the isocyanates are homogeneously and smoothly incorporated.

The cross-linking of the storage-stable one-component dispersion adhesives at room temperature is clearly shown in the following examples:

Comparative Example

Thermoplastic one-component dispersion: 100 g Dispercoll® KA 8758

Example 2.1

Cross-linkable one-component dispersion: 100 g Dispercoll® KA 8758 and 4 g of deactivated isocyanate according to Example 1.1

Example 2.2

Cross-linkable one-component dispersion: 100 g Dispercoll® KA 8758 and 4 g of deactivated isocyanate according to Example 1.2

Films having a thickness of 1000 μm are obtained using a filmdrawing bar, dried (20° C./65% relative humidity) and stored. The tensile strength of these films is determined using a tensile testing machine. The results obtained are listed in the following table.

TABLE 1

Tensile strength of one-component dispersion adhesives which were cross-linked at room temperature

| | Tensile Strength in N/mm$^2$ | | |
|---|---|---|---|
| Days* | Comparative Example | Example 2.1 | Example 2.2 |
| 4 | 7.2 | 10.5 | 13.4 |
| 7 | 7.3 | 13.1 | 14.6 |
| 14 | 7.1 | 13.8 | 13.3 |
| 28 | 6.5 | 11.2 | 15.2 |

*Films were stored at room temperature.

It can be seen from Table 1 that the tensile strength of the Comparative Example after a 4-, 7-, 14-or 28-day storage of the films at room temperature, respectively, is within the range of between 6.5 and 7.3 N/mm$^2$. The tensile strength of the films of Example 2.1 and Example 2.2 is significantly higher than the tensile strength of the films of the Comparative Example: The film of Example 2.1 showed a tensile strength of between 10.5 and 13.8 N/mm$^2$ at the given storage time, while the film of Example 2.2 showed a tensile strength of between 13.3 and 15.2 N/mm$^2$.

The viscosity of the produced one-component dispersion adhesives of Example 2.1 and Example 2.2 remained constant for a storage time of three months at room temperature.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A storage-stable, cross-linkable aqueous one-component dispersion comprising:
    (a) solid diisocyanates consisting essentially of solid diisocyanates which have been surface-deactivated or encapsulated with an amine selected from the group consisting of di-and polyamines so as to have a retarded reactivity, said surface-deactivated or encapsulated diisocyanates being present in an amount within a range of 0.1% by weight to 10% by weight based on the total weight of the aqueous dispersion and being selected from the group consisting of toluene-diisocyanates (TDI), TDI-urethdione, TDI-urea and 4,4'-methylene-di(phenylisocyanate) (MDI), and
    (b) a polyurethane based dispersion adhesive as a polymer component, so that films produced from the dispersion are cross-linkable at room temperature (20° C., 65% relative humidity) without heating.

2. The one-component dispersion according to claim 1, wherein said one-component dispersion has a viscosity that remains constant at room temperature for a storage time of about three months.

3. The one-component dispersion according to claim 1, wherein the films obtained from said dispersion and having a film thickness of 100 μm show a minimum tensile strength of 10.5 N/mm$^2$ after a storage for 4, 7, 14 and 28 days at room temperature.

4. An adhesive, comprising a storage stable, cross-linkable, aqueous one-component dispersion comprising (a) solid diisocyanates consisting essentially of solid diisocyanates which have been surface-deactivated or encapsulated with an amine selected from the group consisting of di-and polyamines so as to have a retarded reactivity, said surface-deactivated or encapsulated diisocyanates being present in an amount within a range of 0.1% by weight to 10% by weight based on the total weight of the aqueous dispersion and being selected from the group consisting of toluene-diisocyanates (TDI), TDI-urethdione, TDI-urea and 4,4'-methylene-di(phenylisocyanate) (MDI), and (b) a polyurethane based dispersion adhesive as a polymer component, so that films produced from the dispersion are cross-linkable at room temperature (20° C., 65% relative humidity) without heating.

5. A film comprising: solid diisocyanates consisting essentially of solid diisocyanates which have been surface-deactivated or encapsulated with an amine selected from the group consisting of di-and polyamines so as to have a retarded reactivity, said surface-deactivated or encapsulated diisocyanates being present in an amount within a range of 0.1% by weight to 10% by weight based on the total weight of the aqueous dispersion and being selected from the group consisting of toluene-diisocyanates (TDI), TDI-urethdione, TDI-urea and 4,4'-methylene-di(phenylisocyanate) (MDI), and (b) a polyurethane based dispersion adhesive as a polymer component, so that the film is cross-linkable at room temperature (20° C., 65% relative humidity) without heating.

6. The film according to claim 5, wherein the film has a thickness of 1000 μm and shows a tensile strength of at least 10.5 N/mm$^2$ after a storage for 4, 7, 14 and 28 days at room temperature.

7. The storage-stable, cross-linkable aqueous one-component dispersion of claim 1, wherein the diisocyanates are selected from the group consisting of toluenediisocyanates (TDI), TDI-urethdione and TDI-urea.

* * * * *